United States Patent
Tu et al.

(10) Patent No.: US 8,359,022 B2
(45) Date of Patent: Jan. 22, 2013

(54) COORDINATION OF TRANSMISSIONS IN WIRELESS COMMUNICATIONS DEVICES

(75) Inventors: Jerome C. Tu, Saratoga, CA (US); Olivier Boireau, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 11/618,479

(22) Filed: Dec. 29, 2006

(65) Prior Publication Data

US 2008/0159182 A1 Jul. 3, 2008

(51) Int. Cl.
*H04W 4/00* (2009.01)
(52) U.S. Cl. ............... 455/422.1; 455/524; 455/525; 370/278; 370/323
(58) Field of Classification Search ............. 370/226, 370/243, 246, 274, 315, 316, 319, 492, 501, 370/285, 401, 413; 455/7, 11.1, 13.1, 13.3, 455/15, 16, 127.4, 553.1
See application file for complete search history.

(56) References Cited

U.S. PATENT DOCUMENTS

| | | | |
|---|---|---|---|
| 2005/0094561 A1* | 5/2005 | Raaf | 370/235 |
| 2005/0176367 A1* | 8/2005 | Verloop et al. | 455/11.1 |
| 2005/0176466 A1* | 8/2005 | Verloop et al. | 455/558 |
| 2008/0102874 A1* | 5/2008 | Gautier et al. | 455/522 |
| 2008/0132234 A1* | 6/2008 | Gilliland | 455/436 |
| 2008/0309490 A1* | 12/2008 | Honkanen et al. | 340/572.1 |

* cited by examiner

*Primary Examiner* — Chuong A Ngo

(57) ABSTRACT

Techniques for coordinating transmissions in wireless communications are disclosed. For instance, an apparatus includes a first transceiver, a second transceiver, and a control module. The first transceiver communicates across a wireless link of a first type, and the second transceiver communicates across a wireless link of a second type. Examples of such first and second types include cellular links and data networking links. The control module authorizes the second transceiver to send wireless transmission upon the occurrence of a compressed mode transmission gap allocated to the first transceiver. Moreover, during this transmission gap, the first transceiver refrains from sending wireless transmissions.

17 Claims, 4 Drawing Sheets

COORDINATION OF TRANSMISSIONS IN WIRELESS COMMUNICATIONS DEVICES

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Furthermore, devices may include multiple radios to handle different wireless technologies. For such a device, transmissions by one of its radios may interfere with the wireless signals received or transmitted by another of its radios. As a result, signal degradation may occur. This degradation can impair or even prevent the device performing various communications applications.

DETAILED DESCRIPTION

Various embodiments may be generally directed to techniques for coordinating transmissions in communications devices. For instance, an apparatus may include an apparatus having a first transceiver, a second transceiver, and a control module. The first transceiver communicates across a wireless link of a first type, and the second transceiver communicates across a wireless link of a second type. Examples of such first and second types include cellular links and data networking links. The control module authorizes the second transceiver to send wireless transmission(s) upon the occurrence of a compressed mode transmission gap that is allocated to the first transceiver. Moreover, during this transmission gap, the first transceiver refrains from sending wireless transmissions.

Various advantages may be obtained through such techniques. For example, interference between signals of different wireless technologies may be reduced. Also, efficiencies and cost savings may be achieved in wireless devices. This is because less shielding and RF isolation circuitry may be needed.

Embodiments of the present invention may involve a variety of wireless communications technologies. These technologies may include cellular and data networking systems. Exemplary data networking systems include wireless local area networks (WLANs), wireless metropolitan area networks (WMANs), and personal area networks (PANs).

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
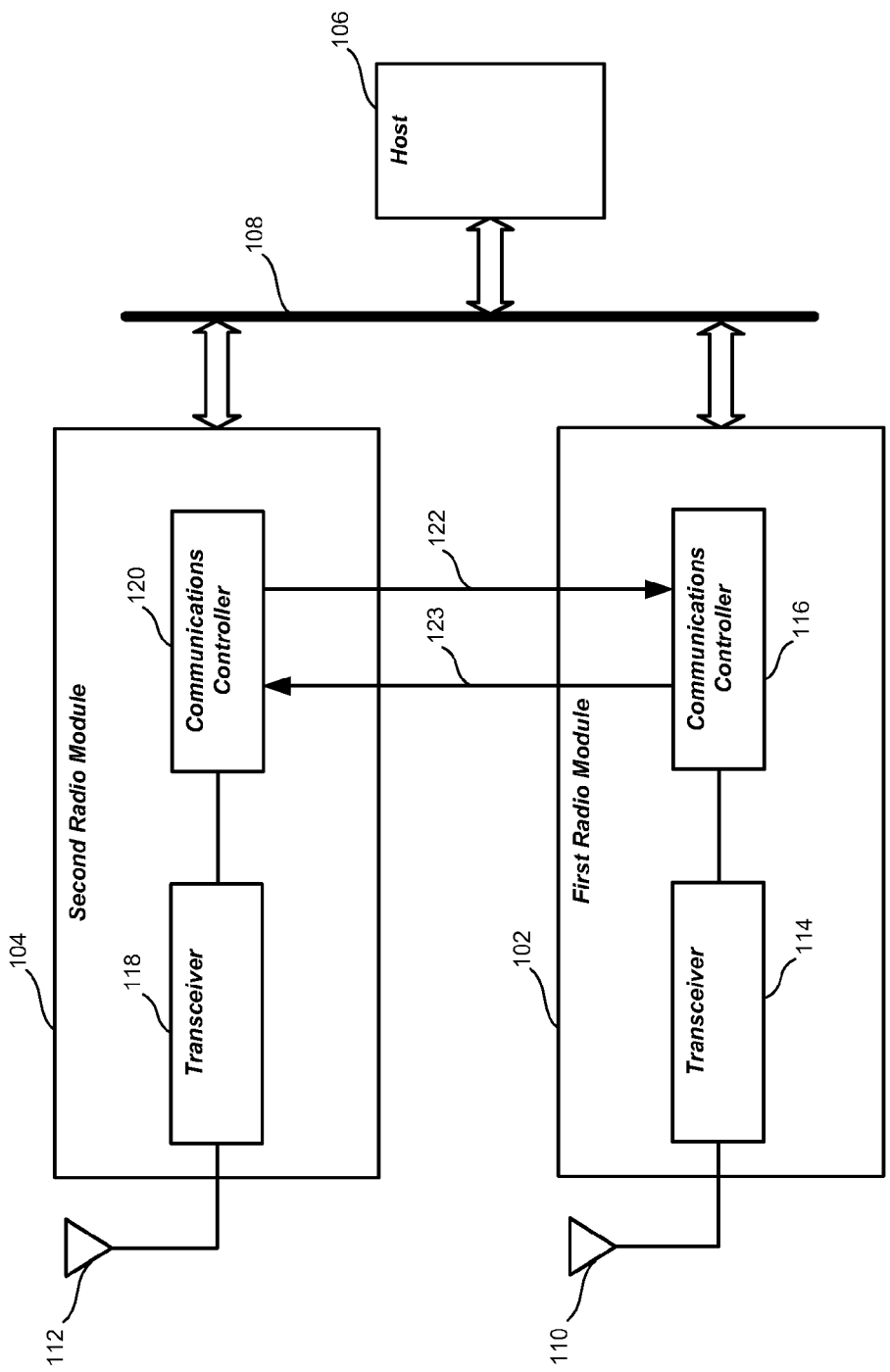
FIG. 1 illustrates an embodiment of an apparatus.

FIG. 1 illustrates one embodiment of an apparatus that may communicate across wireless links. In particular, FIG. 1 shows an apparatus 100 comprising various elements. The embodiments, however, are not limited to these depicted elements. FIG. 1 shows that apparatus 100 may include a first radio module 102, a second radio module 104, a host 106, and an interconnection medium 108. These elements may be implemented in hardware, software, firmware, or in any combination thereof.

Radio modules 102 and 104 may each communicate (through antennas 110 and 112, respectively) with remote devices across various types of wireless links. For example, radio module 102 may communicate across data networking links. Examples of data networking links include wireless local area network (WLAN) links, such as IEEE 802.11 WiFi links. Further examples include wireless metropolitan area (WMAN) links, such as IEEE 802.16 WiMax links and WiBro links. Yet further examples include WiMedia/Ultra Wide Band (UWB) links (such as ones in accordance with Ecma International standards ECMA-368 and ECMA-369). Also, exemplary data networking links include personal area networks (PAN) links such as Bluetooth links, and WiBree (initially developed by Nokia Research Centre) links. The embodiments, however, are not limited to these examples.

Alternatively, radio module 104 may communicate across wireless links provided by one or more wireless cellular or telecommunications systems. For example, radio module 104 may communicate in accordance with the Universal Mobile Telecommunications System (UMTS). UMTS is a mobile telephony technology that may use various underlying air interfaces. A common air interface for UMTS is wide-band code division multiple access (W-CDMA).

FIG. 1 shows that radio module 102 includes a transceiver 114 and a communications controller 116. Transceiver 114 may include a transmitter and a receiver to send and receive wireless transmissions. These transmissions comprise signals that may be generated according to various modulation schemes and transmitted at various frequencies. To provide such features, each transceiver 114 may include electronics, such as modulators, demodulators, amplifiers, filters, and so forth.

Communications controller 116 is coupled to transceiver 114. Communications controller 116 may perform various operations. Examples of such operations include determining when transceiver 114 may send and/or receive wireless transmissions.

Transceiver 114 and communications control module 116 may exchange various forms of information. Such information may be in the form of signals, data messages, and so forth. For example, communications controller 116 may send a transmission directive to transceiver 114 indicating that it may send one or more wireless transmissions. Also, transceiver 114 may indicate to communications controller 116 when it is ready to send a transmission. For instance, transceiver 114 may include a transmission buffer or queue (not shown) that may store entries in the form of data (e.g., packets, datagrams, etc.) for transmission. Transceiver 114 may provide such indications when the buffer or queue contains one or more entries.

As shown in FIG. 1, radio module 104 includes a transceiver 118, and a communications controller 120. Like transceiver 114, transceiver 118 may include a transmitter and a receiver to send and receive wireless transmissions that are exchanged according to various modulation schemes at various frequencies. To provide such features, each transceiver 114 may include electronics, such as modulators, demodulators, amplifiers, filters, and so forth.

Communications controller 120 may perform various operations. For example, communications controller 120 may determine when transceiver 118 may transmit and/or receive information 120. Also, communications controller 120 may perform handoff operations, such as the evaluation of potential handoff candidates or cells. Such evaluations may be based on one or more power measurements received from transceiver 118.

Accordingly, transceiver 118 and communications controller 120 may exchange information with each other. Such information exchanged between transceiver 114 and communications controller 116 may be in the form of signals, data messages, and so forth. The exchanged information may include, for example, directives from communications controller 120 instructing transceiver 118 to perform various power measurements. These power measurements may be made in accordance with a handoff algorithm or process. Also, transceiver 118 may provide communications controller 120 with power measurements data. Moreover, communications controller 120 may send a handoff request to transceiver 118. In turn, transceiver 118 may transmit the request to a base station or network entity for approval.

FIG. 1 shows that apparatus 100 may further include a host 106, which may exchange information with radio modules 102 and 104. As shown in FIG. 1, such exchanges may occur across interconnection medium 108. For instance, host 106 may send information to these radio modules for wireless transmission. Conversely, radio modules 102 and 104 may send information to host 106 that was received from wireless transmissions. In addition, host 106 may exchange information with radio modules 102 and 104 regarding their configuration and operation. Examples of such information include control directives issued by host 106.

Furthermore, host 106 may perform operations associated with one or more protocols (e.g., multiple protocols at various layers). Additionally, host 106 may perform operations associated with user applications. Exemplary user applications include telephony, text messaging, e-mail, web browsing, word processing, and so forth. Moreover, host 106 may provide one or more functional utilities that are available to various protocols, operations, and/or applications. Exemplary utilities include operating systems, device drivers, user interface functionality, and so forth.

Interconnection medium 108 provides for couplings among elements, such as host 106, and radio modules 102 and 104. Thus, interconnection medium 108 may include, for example, one or more bus interfaces. Exemplary interfaces include Universal Serial Bus (USB) interfaces, as well as various computer system bus interfaces. Additionally or alternatively, interconnection medium 108 may include one or more point-to-point connections (e.g., parallel interfaces, serial interfaces, etc.) between various element pairings. Such connections may comprise one or more signal lines. In embodiments, interconnection medium 108 may provide for the exchange of information between radio modules 102 (e.g., between transmission control modules 116), as described herein.

As described above, radio module 104 may engage in UMTS communications that employ WCDMA transmission techniques (referred to herein as UMTS WCDMA). UMTS WCDMA communications employ direct sequence CDMA transmission techniques over 5 MHz frequency channels. These techniques involve the spreading of data with quasi-random bits derived from spreading codes. Communications involving UMTS WCDMA may employ different transmission modes. These modes include a frequency division duplex (FDD) mode and time division duplex (TDD) mode.

In the FDD mode, uplink transmissions (i.e., transmissions from a device to a base station) are each conducted at a frequency channel different from a frequency channel employed for downlink transmissions (i.e., transmissions from a base station to a device). However, in the TDD mode, uplink and downlink transmissions are conveyed on the same frequency channel.

UMTS WCDMA transmissions within a channel are organized according to a repeating frame structure having repeating intervals called frames. During each frame, information, such as payload data and control data may be transmitted. Within each frame, multiple time slots may exist. For instance, UMTS WCDMA provides for 10 millisecond frames that each include fifteen time slots. In turn, each time slot may be 666 microseconds in duration. This frame structure, however, is exemplary. Various length frames, and the number of slots per frame (as well as various slot durations) be employed. For example, high speed downlink packet access (HSDPA), and high speed downlink packet access (HSUPA), which are extensions of UMTS offering greater throughputs, provide for such variations.

During wireless (e.g., cellular) communications, radio module 104 may perform handoff (or handover) operations among various cells. In performing such operations, radio module 104 may make various power measurements to evaluate potential candidate frequencies or cells. These measurements may be made by transceiver 118, while the evaluation of the resulting power measurement data may be performed by communications controller 120.

Certain technologies provide for such power measurements to be made in accordance with a compressed mode. Compressed modes provide a device with time to perform power measurements. For example, UMTS WCDMA may allow a device to engage in such measurements for between one to seven time slots per frame. Frames having allocations for such measurements are called compressed frames.

Compressed frames may occur periodically. This may occur, for example, on directives received from a network entity, such as a base station. Alternatively, radio module 102 may request compressed frame allocations from a network entity. In response to the request, the network entity may grant corresponding allocations. Such directives, and requests may transmitted across UMTS WCDMA channels as control data.

Within a compressed frame, time intervals allocated for power measurements may occur between time slots that remain allocated for wireless transmissions. Such allocated time intervals are referred to herein as transmission gaps. As indicated by their name, transmission gaps are used for a device to make power measurements, and not for transmitting information.

In general operation, apparatus 100 may engage in wireless communications with various types of networks. In addition, apparatus 100 may coordinate wireless activities among radio modules 102 and 104. More particularly, radio module 104 may direct when radio module 102 is authorized to send transmissions.

For instance, FIG. 1 shows control module 120 of radio module 104 sending a transmission authorization indicator 122 to control module 116 of radio module 102. Upon, receipt of transmission authorization indicator 122, radio module 102 may send wireless transmissions. This may involve communications control module 116 sending a transmission directive to transceiver 114.

Transmission authorization indicator 122 may be in response to status indicator 123, which is sent from control module 116 of radio module 102 to control module 120 of radio module 104. Status indicator 123 may provide information regarding the status of radio module 102. For example, status indicator 123 may indicate whether radio module 102 has an established wireless link, and/or whether radio module 102 has information to transmit. The embodiments, however, are not limited to these examples.

Indicators 122 and 123 may be in the form of signals, data messages, or any other suitable form. Also, indicators 122 and 123 may be sent directly between communications control module 120 and communications control module 116. Alternatively, indicators 122 and 123 may be sent through one or more intermediate entities, such as interconnection medium 108.

Radio module 104 may issue transmission authorization indicator 122 at various times. One such time may be during transmission gap(s) allocated to radio module 104 for compressed mode operation. This may prevent some or all of the transmissions sent by radio module 102 from overlapping in time with transmissions sent by radio module 104. This is because radio module 104 foregoes the transmission of signals during such transmission gaps. As a result, interference between signals of these radio modules may advantageously be reduced.

As described above, FIG. 1 provides an exemplary apparatus arrangement. However, the embodiments are not limited to this arrangement. For instance, when engaging in wireless communications, radio modules 102 and 104 may share antenna, instead of using distinct or separate antennas.

Also, FIG. 1 shows host 106 being coupled to one or more radio modules via interconnection medium 108. However, the embodiments are not limited as such. For example, embodiments may not include a separate host. Also, embodiments may provide an integrated host/radio architecture. In such embodiments, features of a host and one or more radio modules may be implemented together in a single entity, such as a processor or package. Accordingly, a single processor (or processing entity) may provide host and radio module(s). Thus, interconnection medium 108 may include non-physical aspects. More particularly, such interconnectivity may be implemented through messages passed between processes or software modules.

In embodiments, transmission authorization indicator 122 may specify a particular time interval during which radio module 102 may transmit signals. This may be in the form of a signal remaining active during this time interval. However, the embodiments are not limited as such.

Figure 2:
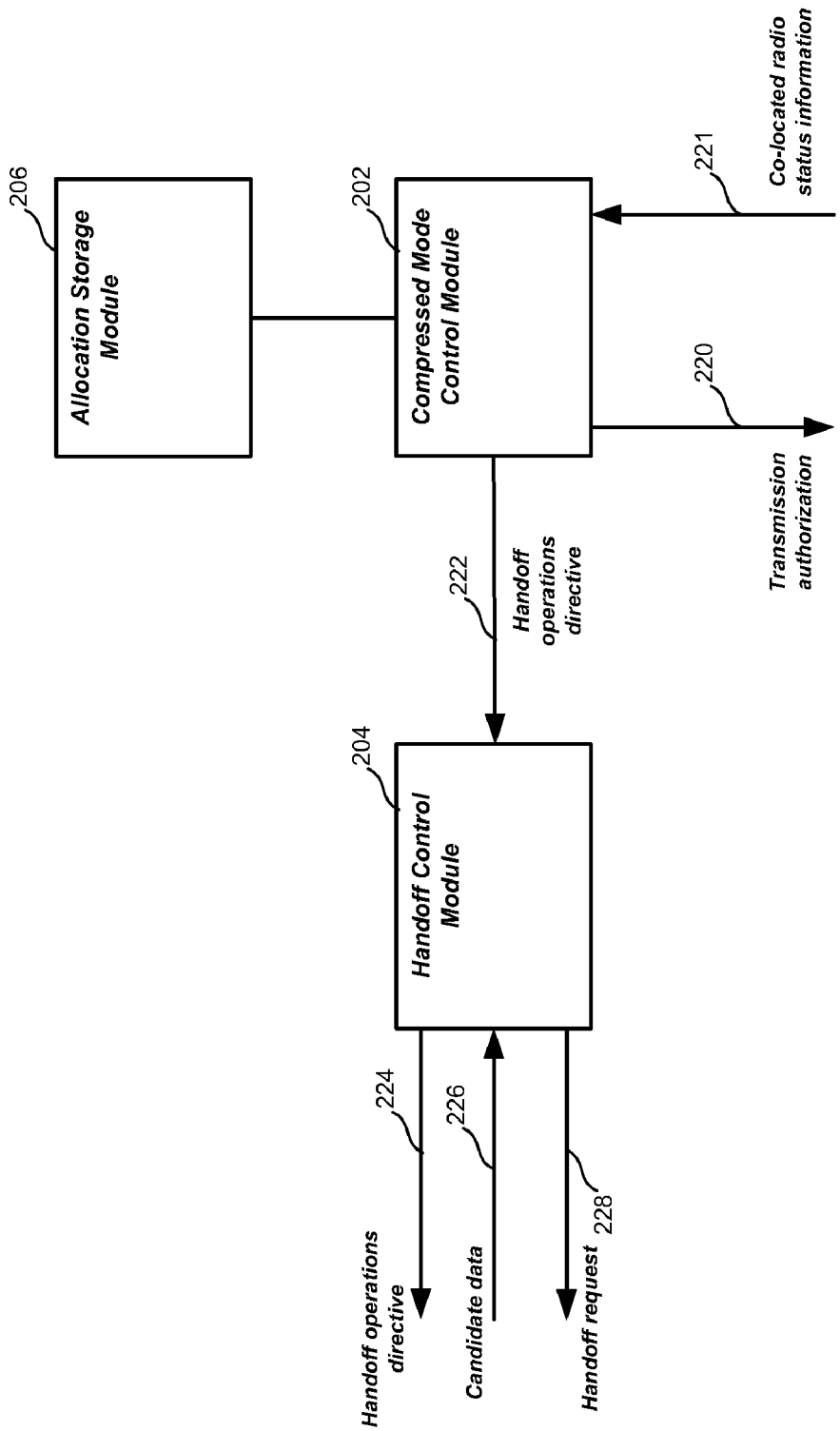
FIG. 2 illustrates an exemplary implementation embodiment.

FIG. 2 is a diagram of an implementation 200 that may be employed in communications control module 120. Implementation 200 may include various elements. For instance, FIG. 2 shows implementation 200 including a compressed mode control module 202, a handoff control module 204, and an allocation storage module 206. These elements may be implemented in hardware, software, firmware, or any combination thereof.

Handoff control module 204 performs handoff operations. This may involve evaluating candidate data (e.g., power measurements) received from its corresponding transceiver. Based on such evaluations, handoff control module 204 may make a handoff determination. This determination may result in the generation of a handoff request for transmission to a remote network entity.

Allocation storage module 206 stores information (e.g., times, frame numbers, etc.) that indicates when compressed mode transmission gaps occur. Such information may be received (via the corresponding transceiver) in the form of transmission(s) from a remote network entity, such as a base station. Allocation storage module 206 may be implemented with one or more forms of storage media, such as memory.

Compressed mode control module 202 determines operations that will occur during compressed mode transmission gaps. As shown in FIG. 2, compressed module control module 202 is coupled to allocation storage module 206. Through access of information stored in allocation storage module 206, compressed mode control module 202 determines when allocated transmission gaps occur.

When such transmission gaps occur, compressed mode control module 202 determines whether its corresponding transceiver should perform power measurements, or whether it should authorize a co-located radio module to send wireless transmissions. This determination may be based on various factors. For example, compressed mode control module 202 may follow a predetermined schedule or an algorithm in which certain transmission gaps are allocated for power measurements and other transmission gaps are allocated for co-located radio module transmissions or communications.

Alternatively or additionally, compressed mode control module 202 may base such determinations on operational characteristics of the co-located radio module. For example, compressed mode control module 202 may determine that the co-located radio module may be authorized to transmit during such transmission gaps upon the occurrence of one or more conditions. Such conditions may include, for example, the co-located radio module having an established wireless link and/or the co-located radio module having information to transmit. As shown in FIG. 2, such operational characteristics may be received from the co-located radio module as status information 221. With reference to FIG. 1, status information 221 may be implemented by status indicator 123.

FIG. 2 shows that when compressed mode control module 202 determines the co-located radio module is authorized to send wireless transmissions, it generates a transmission authorization 220, which is sent to the co-located radio module. With reference to FIG. 1, authorization 220 may be implemented with transmission authorization indicator 122.

Alternatively, compressed mode control module 202 generates a handoff operations directive 222 when it determines that its corresponding transceiver should perform power measurements. As shown in FIG. 2, directive 222 is sent to handoff control module 204. In response, handoff control module 204 may issue a directive 224 for its corresponding transceiver to make power measurements. These measurements may be returned to handoff control module 204 as candidate data 226. In turn, handoff control module 204 may evaluate this data and generate a handoff request 228. As described above, such handoff requests may be transmitted to network entities (e.g., base stations) for approval.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. The embodiments are not limited in this context.

Figure 3:
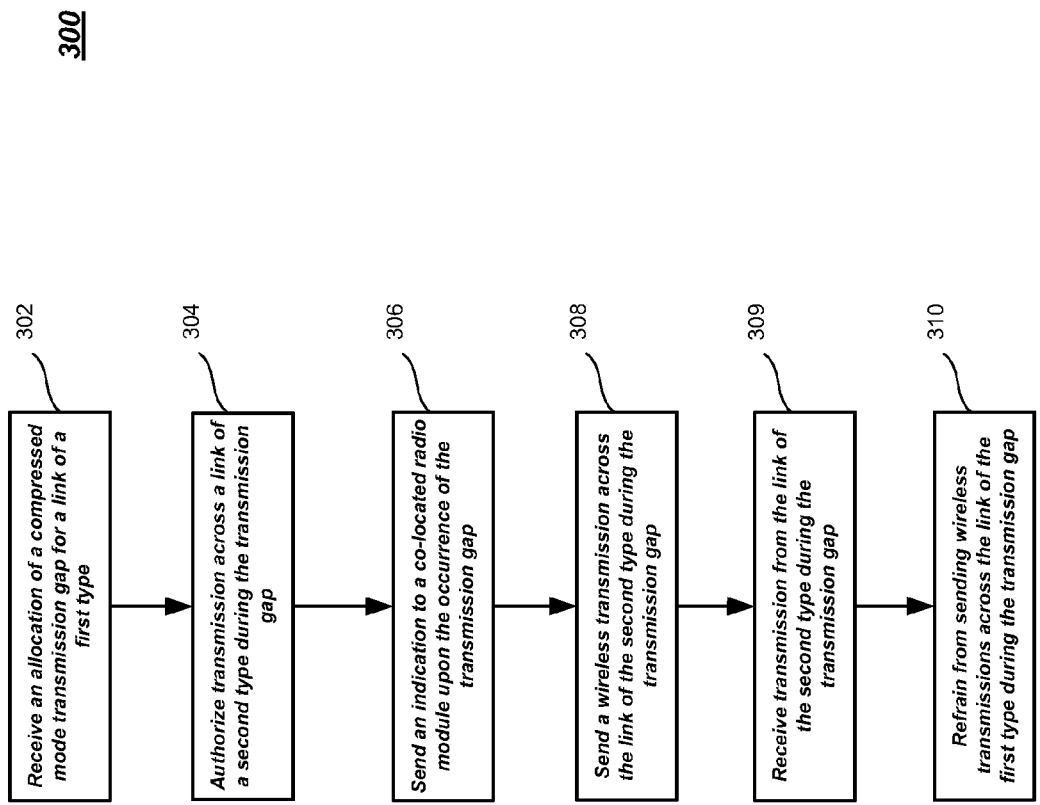
FIG. 3 is an exemplary flow diagram.

FIG. 3 illustrates one embodiment of a logic flow. In particular, FIG. 3 illustrates a logic flow 300, which may be representative of the operations executed by one or more embodiments described herein. As shown in logic flow 300, a block 302 receives an allocation of a compressed mode transmission gap for a wireless link of a first type. This wireless link may be a cellular link, such as a UMTS WCDMA link. However, the embodiments are not limited to such link types. In the context of FIG. 1, this allocation may be received by radio module 104 in the form of a transmission from a remote network entity, such as a base station. Upon receipt, the allocation may be stored, for example, in allocation storage module 206 of FIG. 2.

This allocation may be one that was requested by a terminal device. For example, with reference to FIG. 2, compressed mode control module 202 may request a transmission gap that exceeds typical limits (e.g., greater than seven UMTS WCDMA time slots). Such a transmission gap may be geared for communications across particular communications links. For example, a gap may be requested to accommodate IEEE 802.11 WiFi transmissions. The embodiments, however, are not limited to this context.

Upon the occurrence of the compressed mode transmission gap, a block 304 may authorize a transmission across a wireless link of a second type. This authorization may be for a co-located radio module. For instance, with reference to FIG. 1, the co-located radio module may be radio module 102. Moreover, the link of the second type may be of various types. For instance, this link may be a data networking link, such as an IEEE 802.11 WiFi link. The embodiments, however, are not limited to such link types.

FIG. 3 shows that a block 306 may send an indication to a co-located radio module upon the occurrence of the compressed mode transmission gap. This indication lets the co-located radio module recognize that it may send a transmission across the link of the second type. In the context of FIG. 1, this indication may be implemented as transmission authorization indicator 122.

In addition, FIG. 3 shows a block 308. This block sends a wireless transmission across the wireless link of the second type during the compressed mode transmission gap. Further, logic flow 300 may include a block 309. This block receives transmissions across the wireless link of the second type during the compressed mode transmission gap.

FIG. 3 also shows a block 310, which refrains from sending wireless transmissions across the link of the first type. Block 310 may be implemented, for example, by radio module 104 of FIG. 1. Through such features, interference between transmissions of different link types may be avoided.

Figure 4:
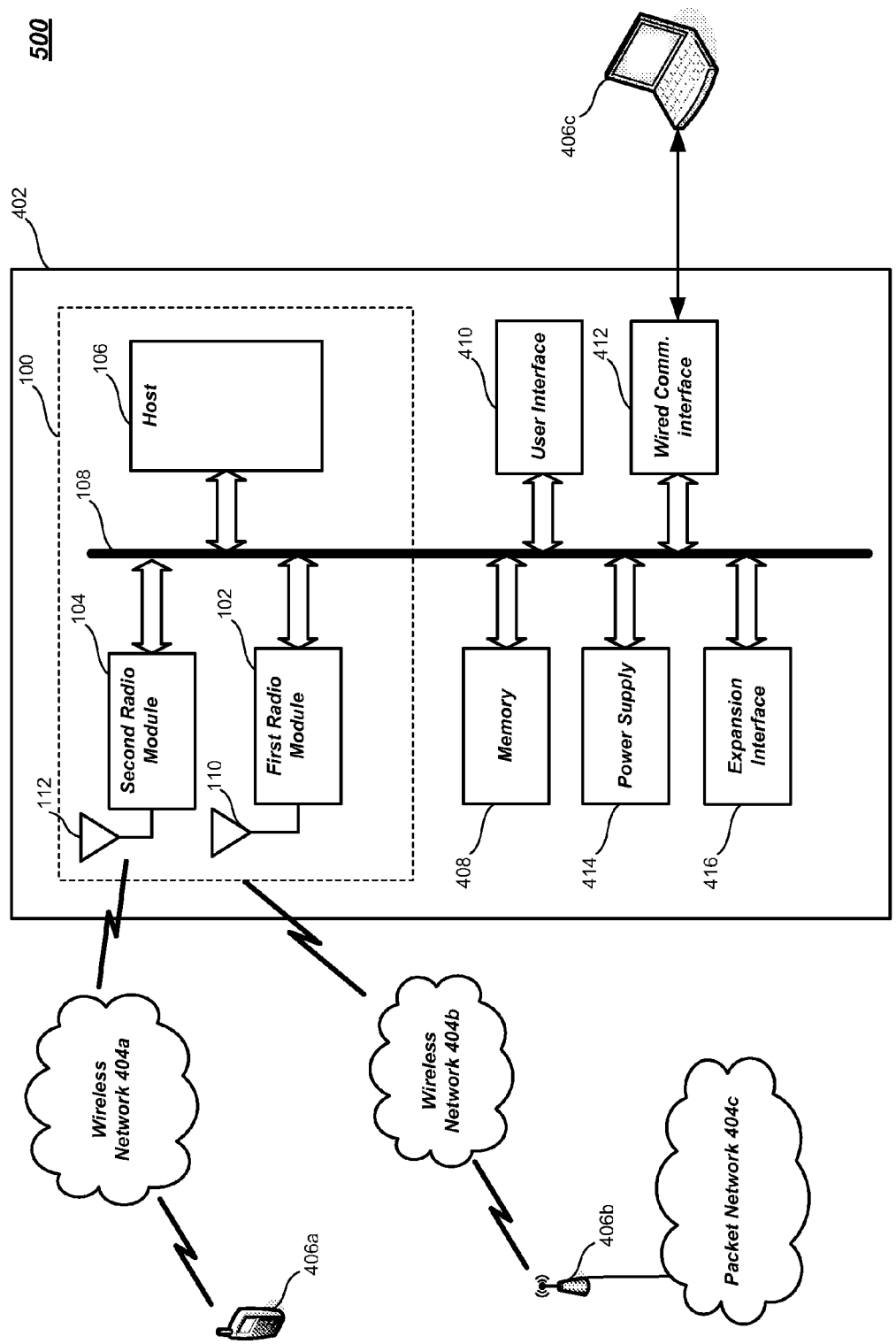
FIG. 4 illustrates an embodiment of a system.

FIG. 4 illustrates an embodiment of a system 400. This system may be suitable for use with one or more embodiments described herein, such as apparatus 100, implementation 200, logic flow 300, and so forth. Accordingly, system 400 may engage in wireless communications across various link types, such as the ones described herein. In addition, system 400 may perform various user applications.

As shown in FIG. 4, system 400 may include a device 402, multiple communications networks 404, and one or more remote devices 406. FIG. 4 shows that device 402 may include the elements of FIG. 1. However, device 402 may include the elements of other embodiments. As described above, such other embodiments may involve integrated host/radio architectures.

Also, device 402 may include a memory 408, a user interface 410, a wired communications interface 412, a power supply (e.g., a battery) 414, and an expansion interface 416. These elements may be implemented in hardware, software, firmware, or any combination thereof.

Power supply 414 provides operational power to elements of device 402. Accordingly, power supply 414 may include a battery. Such a battery may be rechargeable and/or removable. Alternatively or additionally, power supply 414 may include an interface to an external power source, such as an alternating current (AC) source. However, the embodiments are not limited to these examples.

Memory 408 may store information in the form of data. For instance, memory 408 may contain application documents, e-mails, sound files, and/or images in either encoded or unencoded formats. Also, memory 408 may store information contained and managed by allocation storage module 206.

Alternatively or additionally, memory 408 may store control logic, instructions, and/or software components. These software components include instructions that can be executed by one or more processors. Such instructions may provide functionality of one or more elements. Exemplary elements include host 106, one or more components within radio modules 102 and 104, user interface 410, and/or communications interface 412.

Memory 408 may be implemented using any machine-readable or computer-readable media capable of storing data, including both volatile and non-volatile memory. For example, memory 408 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 408 may be included in other elements of system 400. For instance, some or all of memory 408 may be included on a same integrated circuit or chip with elements of apparatus 100 and/or apparatus 400. Alternatively some portion or all of memory 408 may be disposed on an integrated circuit or other medium, for example a hard disk drive, which is external. The embodiments are not limited in this context.

User interface 410 facilitates user interaction with device 402. This interaction may involve the input of information from a user and/or the output of information to a user. Accordingly, user interface 410 may include one or more devices, such as a keyboard (e.g., a full QWERTY keyboard), a keypad, a touch screen, a microphone, and/or an audio speaker.

Wired communications interface 412 provides for the exchange of information with a device 406c (e.g., a proximate device), such as a personal computer. This exchange of information may be across one or more wired connections. Examples of such connections include USB interfaces, parallel interfaces, and/or serial interfaces. In addition, interface 412 may provide for such exchanges across wireless connection(s). An infrared interface is an example of such a connection. The information exchanged with such proximate devices, may include e-mail, calendar entries, contact information, as well as other information associated with personal information management applications. In addition, such information may include various application files, and content (e.g., audio, image, and/or video).

Wired communications interface 412 may include various components, such as a transceiver and control logic to perform operations according to one or more communications protocols. In addition, communications interface 412 may include input/output (I/O) adapters, physical connectors to connect the I/O adapter with a corresponding communications medium.

FIG. 4 shows that device 402 may communicate across wireless networks 404a and 404b. In particular, FIG. 4 shows communications across network 404a being handled by radio module 104, and communications across network 404b being handled by radio module 102. First wireless network 404a may be a cellular network, while second wireless network 404b may be a wireless data network. However, the embodiments are not limited to these examples.

Such wireless communications allow device 402 to communicate with various remote devices. For instance, FIG. 4 shows device 402 engaging in wireless communications (e.g., telephony or messaging) with a mobile device 406a. In addition, FIG. 4 shows device engaging in wireless communications (e.g., WLAN, WMAN, and/or PAN communications) with an access point 406b. In turn access point 406b may provide device 402 with access to further communications resources. For example, FIG. 4 shows access point 406b providing access to a packet network 404c, such as the Internet.

Expansion interface 416 may be in the form of an expansion slot, such as a secure digital (SD) slot. Accordingly, expansion interface 416 may accept memory, external radios (e.g., global positioning system (GPS), Bluetooth, WiFi radios, etc.), content, hard drives, and so forth. The embodiments, however, are not limited to SD slots. Other expansion interface or slot technology may include memory stick, compact flash (CF), as well as others.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Operations for embodiments have been described with reference to various figures and examples. Some of the figures may include a logic flow or operational sequence. Although such figures presented herein may include a particular logic flow or operational sequence, it can be appreciated that these merely provide an example of how general functionality as described herein can be implemented. Further, given logic flows and operational sequences does not necessarily have to be executed in the order presented, unless otherwise indicated. In addition, the given logic flow may be implemented by a hardware element, a software element executed by a processor, or any combination thereof. The embodiments are not limited in this context.

Although the above description was made in the context of UTMS systems, the techniques described herein may be employed with other wireless telecommunications systems. Exemplary systems include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Digital Advanced Mobile Phone Service (IS-136/TDMA) systems, Narrowband Advanced Mobile Phone Service (NAMPS) systems, third generation (3G) systems such as Wide-band CDMA (WCDMA), CDMA-2000, cellular radiotelephone systems compliant with the Third-Generation Partnership Project (3GPP), 3GPP2, and so forth. However, the embodiments are not limited to these examples. For example, various 4G systems may be employed.

Moreover, the techniques described herein may be employed with UMTS variations and extensions (e.g., HSDPA and/or HSUPA). Also, such techniques may be employed with any future developed UMTS technologies or similar technologies.

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a first transceiver to communicate wirelessly across a wireless link of a first type;
a second transceiver to communicate wirelessly across a wireless link of a second type;
a first control module associated with the first transceiver to receive a status indicator from a second control module associated with the second transceiver indicating that the second transceiver has information to transmit, the first control module to send an authorization indicator to the second control module authorizing the second transceiver to send a wireless transmission across the link of the second type upon the occurrence of a compressed mode transmission gap allocated to the first transceiver; and
wherein the compressed mode transmission gap is allocated, through a wireless network, from a network entity.

2. The apparatus of claim 1, wherein the wireless link of the first type is a wireless cellular link.

3. The apparatus of claim 1, wherein the wireless link of the second type is a wireless data communications link.

4. The apparatus of claim 1, wherein the wireless link of the first type is a Universal Mobile Telecommunications System (UMTS) link.

5. The apparatus of claim 1, wherein the wireless link of the second type is an IEEE 802.11 link.

6. A radio module, comprising:
a transceiver to communicate across a wireless link;
a first control module associated with the transceiver to receive a status indicator from a second control module associated with a co-located radio indicating that the co-located radio has information to transmit, the first control module to send an authorization indicator to the second control module authorizing wireless communications by the co-located radio module upon the occurrence of a compressed mode transmission gap allocated to the transceiver; and
wherein the compressed mode transmission gap is allocated, through a wireless network, from a network entity.

7. The radio module of claim 6, wherein the first control module is to authorize wireless communications by the co-located radio module in accordance with an algorithm, the algorithm to allocate certain transmission gaps for power measurements and other transmission gaps for communications by the co-located radio module.

8. The radio module of claim 6, wherein the wireless link is a cellular link.

9. The radio module of claim 6, wherein the wireless link is a Universal Mobile Telecommunications System (UMTS) link.

10. A method, comprising:
receiving, through a wireless network, an allocation of a compressed mode transmission gap for a wireless link of a first type from a network entity;
receiving, by a first control module associated with a transceiver, a status indicator from a second control module associated with a co-located radio indicating that the co-located radio has information to transmit; and
sending an indication to the second control module upon the occurrence of the compressed mode transmission gap, the indication authorizing the co-located radio to send transmissions across the wireless link of the second type.

11. The method of claim 10, further comprising:
sending a wireless transmission across the wireless link of the second type upon the occurrence of the compressed mode transmission gap.

12. The method of claim 10, wherein the wireless link of the first type is a wireless cellular link.

13. The method of claim 10, wherein the wireless link of the second type is a wireless data communications link.

14. The method of claim 10, further comprising:
receiving a wireless transmission from the wireless link of the second type during the compressed mode transmission gap.

15. An article comprising a non-transitory computer-readable storage medium containing instructions that when executed enable a system to:
receive, through a wireless network an allocation of a compressed mode transmission for a wireless link of a first type from a network entity;
receive, by a first control module associated with a transceiver, a status indicator from a second control module associated with a co-located radio indicating that the co-located radio has information to transmit;
send an indication to the second control module upon the occurrence of the compressed mode transmission gap, the indication authorizing the co-located radio to send transmissions across the wireless link of the second type.

16. The article of claim 15, further comprising instructions that if executed enable the system to send a wireless transmission across the wireless link of the second type upon the occurrence of the compressed mode transmission gap.

17. The article of claim 15, further comprising instructions that if executed enable the system to receive a wireless transmission from the wireless link of the second type during the compressed mode transmission gap.

* * * * *